United States Patent Office 3,240,810
Patented Mar. 15, 1966

3,240,810
1,5-BIS(DIHYDROXYPHENYL)-3-PENTYLAMINE AND SALTS THEREOF
Elkan R. Blout, Belmont, Saul G. Cohen, Lexington, and Myron S. Simon, Newton Center, Mass., assignors to Polaroid Corporation, Cambridge, Mass., a corporation of Delaware
No Drawing. Filed Oct. 5, 1964, Ser. No. 401,668
2 Claims. (Cl. 260—570.8)

This application is a continuation-in-part of our application Serial No. 94,450, filed March 9, 1961, (now abandoned), which in turn, is a continuation-in-part of our application Serial No. 680,620, filed August 27, 1957 (now Patent No. 3,003,876, issued October 10, 1961).

This invention relates to chemistry and more particularly to novel chemical compounds.

One object of this invention is to provide novel chemical compounds and suitable syntheses for their preparation.

Another object of this invention is to provide novel chemical compounds useful as photographic developing agents and as intermediates.

Other objects of the invention will in part be obvious and will in part appear hereinafter.

The invention accordingly comprises the several steps and the relation and order of one or more of such steps with respect to each of the others, and the product possessing the features, properties and the relation of elements which are exemplified in the following detailed disclosure, and the scope of the application of which will be indicated in the claims.

For a fuller understanding of the nature and objects of the invention, reference should be had to the following detailed description.

The novel compounds of this invention may be represented by the formula:

$$\left[ Y-CH_2\overset{R^1}{\underset{|}{C}}H- \right]_2 CHNH_2$$

wherein each $R^1$ when unjoined to the other $R^1$ may be hydrogen, an alkyl and preferably a lower alkyl containing no more than 5 carbon atoms or an aryl group and preferably a phenyl group; the $R^1$'s when joined to one another may be an ethylene or propylene group and as such complete a 5 or 6 carbon cycloaliphatic ring; and each Y is an unsubstituted, alkyl-substituted, or halogen-substituted, ortho or para dihydroxyphenyl group; and the acid addition salts thereof. As examples of suitable acid addition salts, mention may be made of the hydrohalides, e.g., hydrochloride or hydrobromide, and of organic acid salts, such as the oxalates.

In a preferred emobdiment, Y is a p-dihydroxyphenyl radical and such compounds may be represented by the formula:

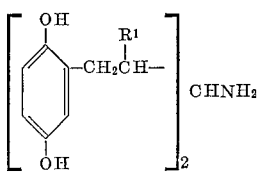

wherein $R^1$ is the same as above.
The preferred compound of this invention is 1,5-bis-(2',5'-dihydroxyphenyl)-3-pentylamine of the structure:

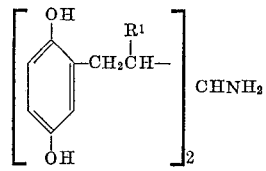

The novel compounds of this invention may be prepared by condensing a suitable dialkoxybenzaldehyde with a ketone of the structure

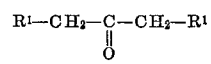

wherein $R^1$ has the same meaning as above, hydrogenating the resulting unsaturated product, condensing the ketone with hydroxylamine to produce the oxime, converting the oxime to an amine by hydrogenation, and removing the alkoxy groups by hydrolysis. In an alternate method, the ketone condensation product may be converted directly to the amine by reductively aminating the keto group with ammonia and hydrogen.

The ketones used in preparing the novel compounds of this invention should contain methyl ($-CH_3$) or methylene ($-CH_2-$) radicals on both sides of the keto group and adjacent to the keto group, in order that the aldehyde condensation may proceed. As examples of ketones useful in preparing the novel compounds of this invention, mention may be made of acetone, methyl-ethyl ketone, diethyl ketone, phenyl acetone, cyclopentanone and cyclohexanone.

As examples of suitable dialkoxybenzaldehydes, mention may be made of 2,5-dimethoxybenzaldehyde and 3,4-dimethoxybenzaldehyde and their alkyl- and halogen-substituted derivatives.

The following example illustrates the preparation of 1,5-bis-(2',5'-dihydroxyphenyl)-3 - pentylamine and is given for purposes of illustration only.

Example

Acetone (6.8 g.) and 2,5-dimethoxybenzaldehyde (39 g.) are added to a vigorously stirred solution of sodium hydroxide (23.5 g.) in a mixture of water (235 cc.) and ethanol (190 cc.). The mixture is stirred at room temperature for about an hour after which a yellow solidified oil is filtered off. Extraction with ether yields 1,5-bis-(2',5'-dimethoxyphenyl)-penta-1,4-dien-3-one as yellow needles melting at 108 to 108.5° C. This product, dissolved in ethyl acetate, is hydrogenated over Raney nickel, at room temperature and a pressure of 30 p.s.i., to give 1,5-bis-(2',5'-dimethoxyphenyl)-3-pentanone as a white crystalline solid melting at 75° C.

The oxime of the above ketone is prepared by refluxing the ketone with hydroxylamine in a 50:50 mixture, by volume, of pyridine and ethanol. After refluxing this mixture for two hours, it is evaporated to an oil, which is thoroughly washed with water. The product which crystallizes from this oil is recrystallized from ether to give a white crystalline product melting at 85 to 87° C. Analysis of the oxime gives a nitrogen value of 3.7% as compared with the calculated 3.75%.

The 1,5-bis-(2',5'-dimethoxyphenyl)-pentanone-3-oxime (40 g.) is hydrogenated in ethanol over Raney nickel at 120° C. and a hydrogen pressure of 1200–1300 p.s.i. for 1 to 1½ hours. The hydrogenation product is filtered, the ethanol evaporated off and the residue taken up in ether. Precipitation with hydrochloric acid gives a 90% yield of the 1,5-bis-(2',5'-dimethoxyphenyl)-3-pentylamine hydrochloride as a white solid melting at 101 to 103° C.

The dimethoxy amine hydrochloride is refluxed under nitrogen for five hours in concentrated hydrobromic acid, after which the reflux mixture is evaporated to dryness at 100° C. in vacuo. This product is washed several times in ethanol, precipitated from an ethanol-ethyl ether mixture and triturated with ethyl ether. Crystallization from hot benzene yields the desired 1,5-bis-(2',5'-dihydroxyphenyl)-3-pentylamine, as the hydrobromide, as a tan solid melting with decomposition at 156 to 160° C. Analysis of this product gives a nitrogen value of 3.7% compared to the calculated 3.6%.

As pointed out previously, the novel compounds of this invention are useful as photographic developing agents, as disclosed in our U.S. application Serial No. 680,620, filed August 27, 1957, now U.S. Patent No. 3,003,876, issued October 10, 1961.

The novel compounds of this invention are again useful as intermediates. As an example of such use, mention may be made of the preparation of the dye developers claimed and disclosed in the copending application of Elkan R. Blout and Myron S. Simon, Serial No. 680,619 filed August 27, 1957, now abandoned, wherein the compounds of this invention are used in the syntheses of said dye developers.

The novel compounds of this invention are further useful as antioxidants in petroleum products.

Since certain changes may be made in the above product and process without departing from the scope of the invention herein involved, it is intended that all matter contained in the above description shall be interpreted as illustrative and not in a limiting sense.

What is claimed is:

1. A compound selected from the group consisting of compounds represented by the formula:

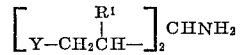

wherein each $R^1$ is selected from the group consisting of hydrogen, lower alkyl and phenyl groups provided that when one said $R^1$ is a phenyl group the other $R^1$ is hydrogen, and each Y is a para-dihydroxyphenyl group, and the acid addition salts thereof.

2. 1,5-bis-(2',5'-dihydroxyphenyl)-3-pentylamine.

No references cited.

CHARLES B. PARKER, *Primary Examiner.*